April 17, 1951

D. H. CLEWELL 2,548,947

PRESSURE MEASURING DEVICE

Filed March 12, 1946

INVENTOR.
DAYTON H. CLEWELL
BY Sidney A. Johnson
ATTORNEY

Patented Apr. 17, 1951

2,548,947

UNITED STATES PATENT OFFICE 2,548,947

PRESSURE MEASURING DEVICE

Dayton H. Clewell, Dallas, Tex., assignor, by mesne assignments, to Socony-Vacuum Oil Company, Incorporated, New York, N. Y., a corporation of New York Application March 12, 1946, Serial No. 653,865

5 Claims. (Cl. 177—352.7)

This invention relates to apparatus for measuring pressure changes resulting from the detonation of explosive material and has for an object the provision of a pressure-measuring device which is completely non-directional.

In seismic exploration, charges of dynamite or other suitable explosive are utilized to generate seismic waves. Measurement of the travel times of the waves and of their reflections yield useful data by means of which sub-surface interfaces may be plotted. Since the generation of the seismic waves depends upon the pressure changes resulting from the explosion of the charge, it is desirable to know the character of such pressure changes.

In carrying out the invention in one form thereof, there is provided a completely non-directional pressure-responsive device which produces signals whose magnitudes are representative of the magnitude of the pressure changes resulting from the explosion of a charge. More specifically, the invention consists of a hollow sphere, preferably of steel, filled with carbon granules, with an electrode disposed centrally thereof. The sphere will be compressed in accordance with pressure changes and will produce variations in the resistance of the carbon granules indicative of the magnitude of such pressure changes.

Figure 1:
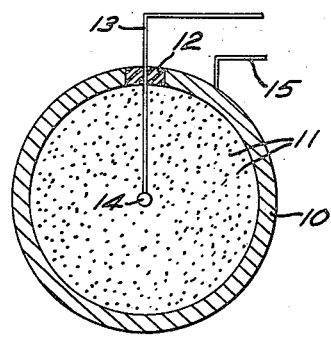
Figure 2:
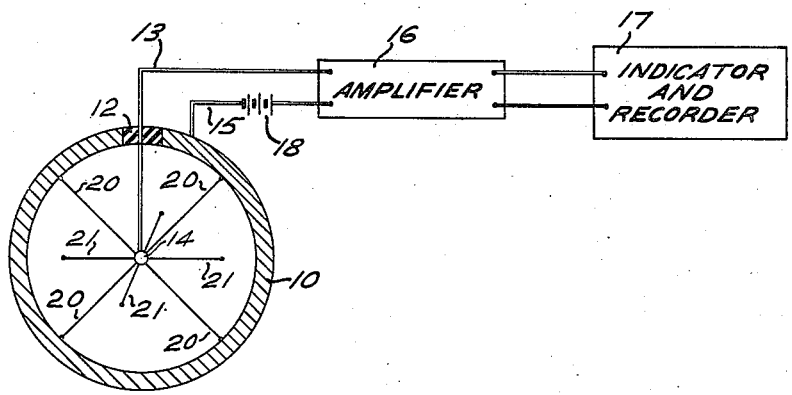

For a more detailed explanation of the invention and for further objects and advantages thereof, reference should be had to the following description taken in conjunction with the accompanying drawing, in which:

Fig. 1 is a sectional view of a pressure-measuring device constructed in accordance with the invention; and Fig. 2 schematically illustrates a modification of Fig. 1 together with a block diagram of the measuring elements to be utilized in connection therewith.

Referring to the drawing, a hollow spherical sheath 10, preferably of an elastic material such as steel, is filled with carbon granules 11. These carbon granules completely fill the sphere and are under a relatively light initial pressure such as may be obtained by gently pressing into the sphere a final small quantity thereof after gravity filling. A plug 12 of insulating material whose area is small compared to that of the sphere 10 is then screwed into the sphere 10 or otherwise rigidly attached thereto. The plug 12 has extending therethrough a conductor 13 which terminates at the center of the sphere in an electrode 14. The electrode 14 is in intimate electrical contact with the carbon granules 11, while the conductor 13 is preferably insulated therefrom. A second conductor 15 is electrically attached to the steel sphere 10. It will be seen that pressures of substantial magnitude will deform the sphere 10, thus changing the compression of the carbon granules 11 to produce a substantial change in current flowing through them. The response of the sphere 10 is substantially completely non-directional. For pressure waves of equal magnitude, corresponding deformation of the sphere 10 will occur regardless of the area of the sphere which receives the pressure changes.

In utilizing the invention the sphere 10 is preferably lowered into a shothole in which a charge of dynamite or the like is to be detonated. The conductors 13 and 15 lead to an amplifier 16, the output of which is fed into an indicator and/or recorder 17. The conductors 13 and 15 may be enclosed in pipe or otherwise protected from the explosive blast, should that be necessary. Preferably a battery 18 is included in the input circuit, including conductors 13 and 15, to establish a current flow of predetermined magnitude through the carbon granules within the sphere 10. Upon explosion of the charge of dynamite the sphere will be deformed by an amount related to the magnitude of the pressure changes produced by the explosion. The resultant change in the resistance of the current paths between the electrode 14 and the sphere 10 will be reflected in current variations in the input circuit. These current variations or signals are then amplified by the amplifier 16 and applied to the indicator and recorder 17. They may be observed directly, or preferably they are recorded as by an oscillographic recorder of which there are many suitable types known to those skilled in the art. For example, the recorder may be of the string-galvanometer type generally utilized in seismic surveying. The charge of explosive and the manner in which it is detonated form no part of the present invention. Details of suitable detonation systems are well known to those skilled in the art. They may be of the type shown in Minton Patent No. 2,189,741 and which may include the device of the McCarty Patent No. 2,160,222.

While a preferred embodiment of the invention has been described, it is to be understood my invention is not limited to the specific modification illustrated since certain minor changes may be made therein without departing from the scope of the invention as set forth in the appended claims, such for example as utilizing a polygonal enclosure or a cube, or an enclosure of other shape but whose dimensions in all directions across the central portion thereof are substantially the same; i. e., one symmetrical with respect to three mutually perpendicular axes, so as to give to it a response which is substantially non-discriminatory with respect to direction of application of the pressures to be measured. Instead of filling the enclosure or sphere 10 with carbon granules, strain gauge wires 20 and 21 may be disposed symmetrically between the center electrode 14 and the inner wall of the sphere. The wires 20 and 21 are symmetrical in all directions within the sphere. Consequently, deformation of the sphere in any direction changes the resistance of the wires 20 and 21, preferably under slight initial tension, and so produces a change in the voltage applied to the amplifier 16. This change in voltage will be related to the magnitude of the pressure which caused the deformation of the enclosure or sphere 10. Strain gauges may also be bonded in symmetrical manner to the surface of the sphere, strain gauges of the type shown in Simmons Patent No. 2,292,549 being suitable for this purpose.

What is claimed is:

1. A device for use in measurement of pressure changes due to the detonation of an explosive charge comprising a steel spherical sheath substantially entirely of uniform thickness over its entire surface and deformable by pressures incident to detonation of said charge, resistance means within said sheath and variable by said deformation, and means including a conductor insulated from said steel sheath for completing an electrical circuit through said resistance means to said sheath.

2. A device for use in measurement of pressure changes due to the detonation of an explosive charge comprising a steel spherical sheath substantially entirely of uniform thickness over its entire surface and deformable by pressures incident to detonation of said charge, resistance means within said sheath and variable by said deformation, means including a conductor extending through said sheath for completing an electrical circuit through said resistance means to said sheath, and insulating means forming a part of said sheath and of area small compared to that of the sheath for insulating said conducting means at the entry thereof into said sheath.

3. A device for use in measurement of pressure changes due to the detonation of an explosive charge comprising a steel sheath presenting a uniform resistance to deformation over its entire surface filled under light pressure with carbon granules, and means including a conductor insulated from said steel enclosure for completing an electrical circuit through said carbon granules to the enclosure itself for said measurement of pressures incident to the detonation of said charge, said enclosure having dimensions in each direction which make it substantially non-discriminatory as to the direction in which said pressures are applied thereto.

4. A device for use in measurement of pressure changes due to the detonation of an explosive charge comprising a hollow steel sphere of uniform wall thickness filled under light pressure with carbon granules, and means including a conductor insulated from said steel sphere for completing an electrical circuit through said carbon granules to the sphere itself for said measurement of pressures incident to the detonation of said charge, said sphere being completely non-discriminatory as to the direction in which said pressures are applied thereto.

5. A device for the measurement of pressure changes due to detonation of an explosive charge comprising a hollow spherical enclosure formed of an elastic material, resistance wires within said enclosure and oriented symmetrically and diametrically to effect changes in their resistance upon deformation of said enclosure in any direction, and means completing an electrical circuit through said wires for measurement of changes in their resistance for determining the magnitude of the pressure which caused said deformation.

DAYTON H. CLEWELL.

REFERENCES CITED

The following references are of record in the file of this patent:

UNITED STATES PATENTS

| Number | Name | Date |
|---|---|---|
| 228,507 | Bell | June 8, 1880 |
| 768,568 | Mundy | Aug. 23, 1904 |
| 1,256,708 | Lowe | Feb. 19, 1918 |
| 1,275,776 | Skinderviken | Aug. 13, 1918 |
| 1,335,238 | Hopkins | Mar. 30, 1920 |
| 2,163,518 | Postlethwaite | June 20, 1939 |
| 2,305,717 | La Bell | Dec. 22, 1942 |
| 2,340,777 | Stanley | Feb. 1, 1944 |
| 2,353,920 | Muzzey | July 18, 1944 |
| 2,360,886 | Osterberg | Oct. 24, 1944 |
| 2,365,015 | Simmons | Dec. 12, 1944 |
| 2,398,401 | Bancroft et al. | Apr. 16, 1946 |
| 2,434,900 | Black et al. | Jan. 27, 1948 |
| 2,435,231 | McPherson | Feb. 3, 1948 |

FOREIGN PATENTS

| Number | Country | Date |
|---|---|---|
| 703,923 | France | May 8, 1931 |